United States Patent [19]

Nellums

[11] Patent Number: 4,569,250

[45] Date of Patent: Feb. 11, 1986

[54] POSITIVE DRIVE WITH TORQUE RESPONSIVE DAMPENER

[75] Inventor: Richard A. Nellums, Union Lake, Mich.

[73] Assignee: Eaton Corporation, Cleveland, Ohio

[21] Appl. No.: 602,994

[22] Filed: Apr. 23, 1984

[51] Int. Cl.[4] ............................................. F16H 35/04
[52] U.S. Cl. ...................................... 74/650; 74/711; 192/56 R; 192/89 A
[58] Field of Search .................... 74/650, 711; 192/54, 192/56 R, 89 A

[56] References Cited

U.S. PATENT DOCUMENTS

| | | | |
|---|---|---|---|
| 2,060,558 | 11/1936 | de Lavand | 74/650 |
| 2,179,923 | 11/1939 | de Lavand | 74/650 |
| 2,720,796 | 10/1955 | Schou | 74/711 |
| 2,932,218 | 4/1960 | Russell | 74/711 |
| 2,978,929 | 4/1961 | Roberts | 74/711 |
| 3,146,842 | 9/1964 | Nelson et al. | 74/710.5 X |
| 3,195,371 | 7/1965 | Christie | 74/710.5 X |
| 3,283,611 | 11/1966 | Weismann et al. | 74/650 |
| 3,502,177 | 3/1970 | Christie | 184/11 |
| 3,611,833 | 10/1971 | Boremor | 74/711 |
| 3,831,462 | 8/1974 | Boremor | 74/711 |
| 4,400,996 | 8/1983 | Schou | 74/650 |
| 4,424,725 | 1/1984 | Banks | 74/650 |
| 4,513,633 | 4/1985 | Goscenski, Jr. | 74/650 |

FOREIGN PATENT DOCUMENTS 2119040 11/1983 United Kingdom ................. 74/650

Primary Examiner—Leslie A. Braun
Assistant Examiner—Dirk Wright
Attorney, Agent, or Firm—C. H. Grace; H. D. Gordon

[57] ABSTRACT

A positive drive (10) utilizing a secondary clutch (76, 78, 132, 134) to frictionally couple the drive cam (22) and housing (12) to the output couplings (34, 36) regardless of engagement of the primary clutch (52, 54 and 66, 68) for preload and dampening purposes is provided. The magnitude of the torque transfer capacity of the secondary clutch between the drive cam and the faster rotating output coupling includes a fixed magnitude component supplied by a resilient biasing member (72 and 74) and a variable magnitude component which increases with increases in the magnitude of difference between torque transmitted to the slower and faster rotating wheels by the clutches associated therewith.

25 Claims, 8 Drawing Figures

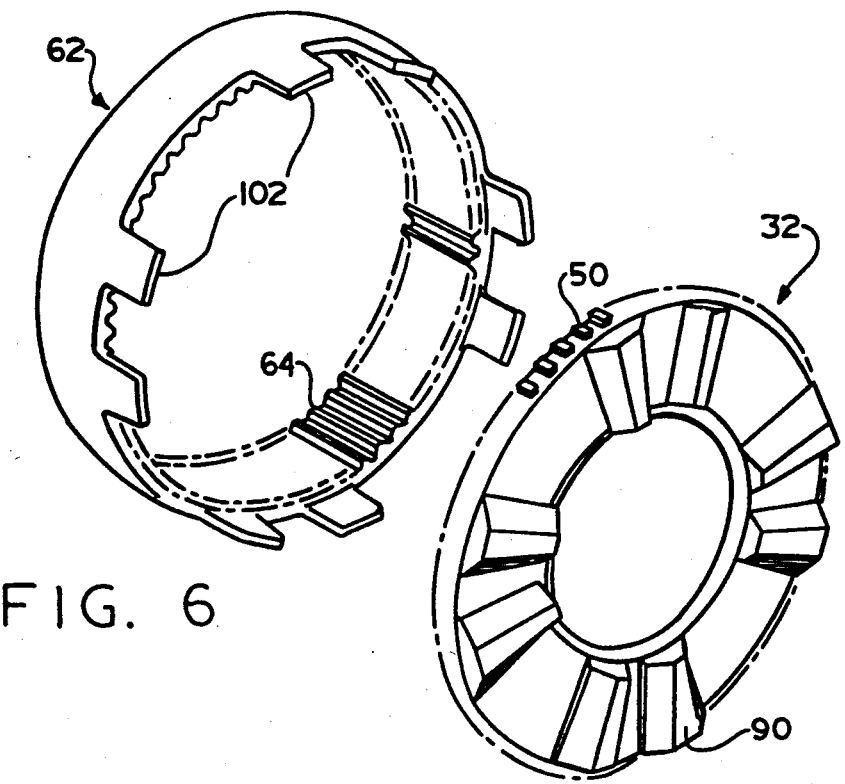
FIG. 6
FIG. 8
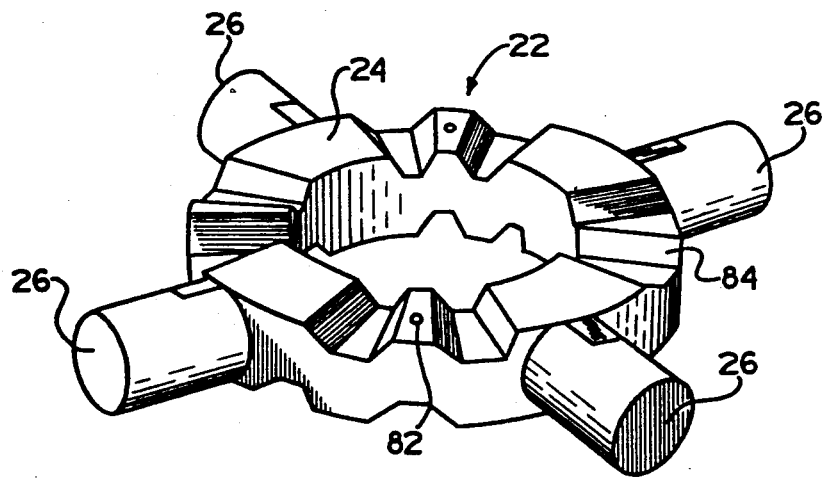
FIG. 7

POSITIVE DRIVE WITH TORQUE RESPONSIVE DAMPENER

BACKGROUND OF THE INVENTION

1. Field of the Invention

The present invention relates to traction modifiers of the positive drive type and in particular to an improved structure for dampening shutter in positive drive devices.

2. Description of the Prior Art

Traction modifying devices are well known in the prior art and are usually categorized as limited slip differentials, such as are illustrated in U.S. Pat. No. 3,611,833, locking differentials such as illustrated in U.S. Pat. Nos. 2,978,929 and 3,831,462 or positive drives. Traction modifying devices have become popular for use in the drive trains of vehicles between the vehicle transmission and the driven wheels. The primary function of a traction modifier is to facilitate driving on slippery surfaces and off-road conditions. Traction modifiers of the positive drive type are well known in the prior art and examples thereof are illustrated in U.S. Pat. Nos. 2,060,558; 2,179,923; 2,720,796 and 4,400,996, and in published UK patent application GB No. 2,119,040A, the disclosures which are all hereby incorporated by reference.

In general, a positive drive device includes an input member adapted to be driven by the input driving torque transmitted from the power source and first and second output members adapted to drive the vehicle wheels. First and second clutch means are operably associated with the first and second output members, respectively, and each of the clutch means has a disengaged mode and engaged mode. In the disengaged mode of the clutch means, its respective output member rotates relative to the input member, while in the engaged mode, the output member is maintained in the predetermined rotational relationship with the input member. First and second cam means are operably associated with the first and second clutch means, respectively, to move the respective clutch means from the disengaged mode to the engaged mode in response to movement of the cam means from a neutral position to an actuated position.

While the positive drive described herein is utilized in a drive axle, positive drive devices are also well suited for use in power dividers between a series of tandem axles and/or in transfer cases between driven front and rear axle assemblies.

During substantially straight driving movement of a vehicle employing a positive drive, engine power is transmitted approximately equally to the driven wheels, which rotate at the same speed. During a potential spin-out condition, engine power is transmitted to the driven wheels in proportion to their instantaneous traction capability, whereby the wheels are still driven in the same speed.

When the vehicle employing a positive drive turns a tight corner, power is transmitted only to the slower moving (i.e., the inside) wheel, while the faster moving wheel is permitted to substantially free-wheel, relative to the input. When the vehicle is making a gradual turn, the positive drive drives both wheels at substantially the same speed and transmits slightly more power towards the inside wheel (which slips slightly) than to the outside wheel. Thus, a positive drive performs in a manner similar to an open (i.e. conventional) differential during operating conditions which would make an open differential desireable, and performs in a manner similar to a rigid axle when operating conditions would make a rigid axle desireable.

It is an important feature of a positive drive that the device includes two clutches, preferably friction clutches, either of which may be engaged independently of the other and that engagement of the clutches is the means of torque transmission in the normal drive mode, and when there is a speed differential between the two outputs, only the clutch transmitting torque to the slower turning wheel is fully engaged. It is also known, see copending U.S. patent application Ser. No. 538,030, filed Sept. 30, 1983 and assigned to the same assignee as the present invention, that under certain conditions the clutch normally supplying torque to the faster rotating output should be applied with at least a minimum torque transmitting capacity for dampening purposes to minimize or eliminate so called "shutter" of the positive drive device.

Typically, the first and second clutches are applied by means of first and second clutch cams, respectively, which are axially moved to a clutch engaged position by means of a drive cam which interacts with the clutch cams by means of interacting ramp surfaces, balls provided in ramped cavities, or the like. As torque must be provided to the output member in both the forward and reverse modes of operation of the vehicle, each of the clutch cams will have first rotational position relative to the drive cam wherein the clutch cam is not axially displaced into a clutch engaging position and two positions corresponding to rotational displacement in both directions from the first position wherein the clutch cams will be axially displaced to a clutch engaging position. Accordingly, in operating conditions wherein it is desired to maintain one of the clutches in a disengaged condition, it is important to maintain the clutch cam associated therewith in the first position relative to the drive cam thereof. For this purposed, it is known to utilize interacting teeth or the like, usually referred to as "balking means", to limit the relative rotational freedom between the two clutch cams.

While the prior art traction modifiers of the positive drive type, especially those wherein the clutch driving the faster moving output member is applied with a predetermined torque capacity to minimize the problem of shutter, are highly functionally desireable, the prior art designs have not been totally satisfactory as nonstandard differential housings were required, the components of the prior art devices have been rather complicated and expensive to manufacture and/or assemble, and/or have utilized means to limit relative rotational movement between the two drive cams which are relatively complicated and expensive to produce and/or utilize shutter dampening structure which provides a substantially constant shutter dampening torque connection between the driving cam and the nondriven output which is inadequate for dampening high energy shutter or creates an undesireably high constant drag on the nondriven output.

SUMMARY OF THE INVENTION

In accordance with the present invention, the drawbacks of the prior art have been minimized to the extent that a relatively simple and inexpensive positive drive type traction modifier is provided. The improved traction modifier is suitable for use in standard differential housings of the type normally utilized with standard open differentials. The improved positive drive of the present invention includes a generally annular tube-like clutch sleeve for each clutch, which clutch sleeve is provided with axially extending interior splines for mounting the clutch cam and a portion of the clutch discs to the sleeve member for rotation therewith and usually axial movement relative thereto. A plurality of stop or "balking" fingers are formed integrally with the sleeve and extend from each of the sleeves towards the clutch sleeve associated with the other clutch member for interaction therewith to limit relative rotational movement of the two clutch cams. As the so called stop or balking fingers extend from the sleeve member and are integral therewith, the fingers are at a relatively large diameter location whereat angular accuracy for a given manufacturing tolerance is greater.

A secondary frictional coupling or connection between the driving members and the output couplings, independent of the primary clutch means associated with the output coupling, is provided for shutter dampening and/or preload purposes. The secondary frictional coupling is of a total torque transfer capacity magnitude comprising two components, a first fixed component and a second variable component. The second variable component is present when and only when the output coupling is substantially non-driven (i.e. driven with substantially less torque) by the primary clutch means as engaged by the clutch cams, varies with the magnitude of differential torque transferred to the driven output coupling and preferably is provided by a portion of the unbalanced axial reaction forces on the drive cam. Typically, the fixed component of the secondary coupling will provide at least preload torque for the primary clutch means while the variable component is additive with the fixed component to provide a total grounding connection which will frictionally ground the substantially nondriven output coupling to the input members for shutter dampening purposes.

It is preferred that at least a portion of the dampening frictional connection be a direct surface to surface connection, i.e. no backlash. As the variable component may not be sufficient to provide the total dampening required, the magnitude of the fixed component is selected to be the minimum required for preload purposes and to provide adequate dampening in combination with the variable component.

Accordingly, it is an object of the present invention to provide an improved traction modifier of the positive drive type.

A further object of the present invention is to provided a positive drive utilizing improved structure to provide a shutter dampening frictional connection between the drive members and the nondriven or substantially nondriven output coupling.

These and other objects and advantages of the present invention will become apparent from a reading of the detailed description of the preferred embodiment taken in connection with the attached drawings.

BRIEF DESCRIPTION OF THE DRAWINGS

FIG. 6 is a perspective view of the clutch sleeve of the present invention.

FIG. 7 is a perspective view of the drive cam of the present invention.

FIG. 8 is a perspective view of the clutch cam of the present invention.

DETAILED DESCRIPTION OF THE PREFERRED EMBODIMENT

Figure 1:
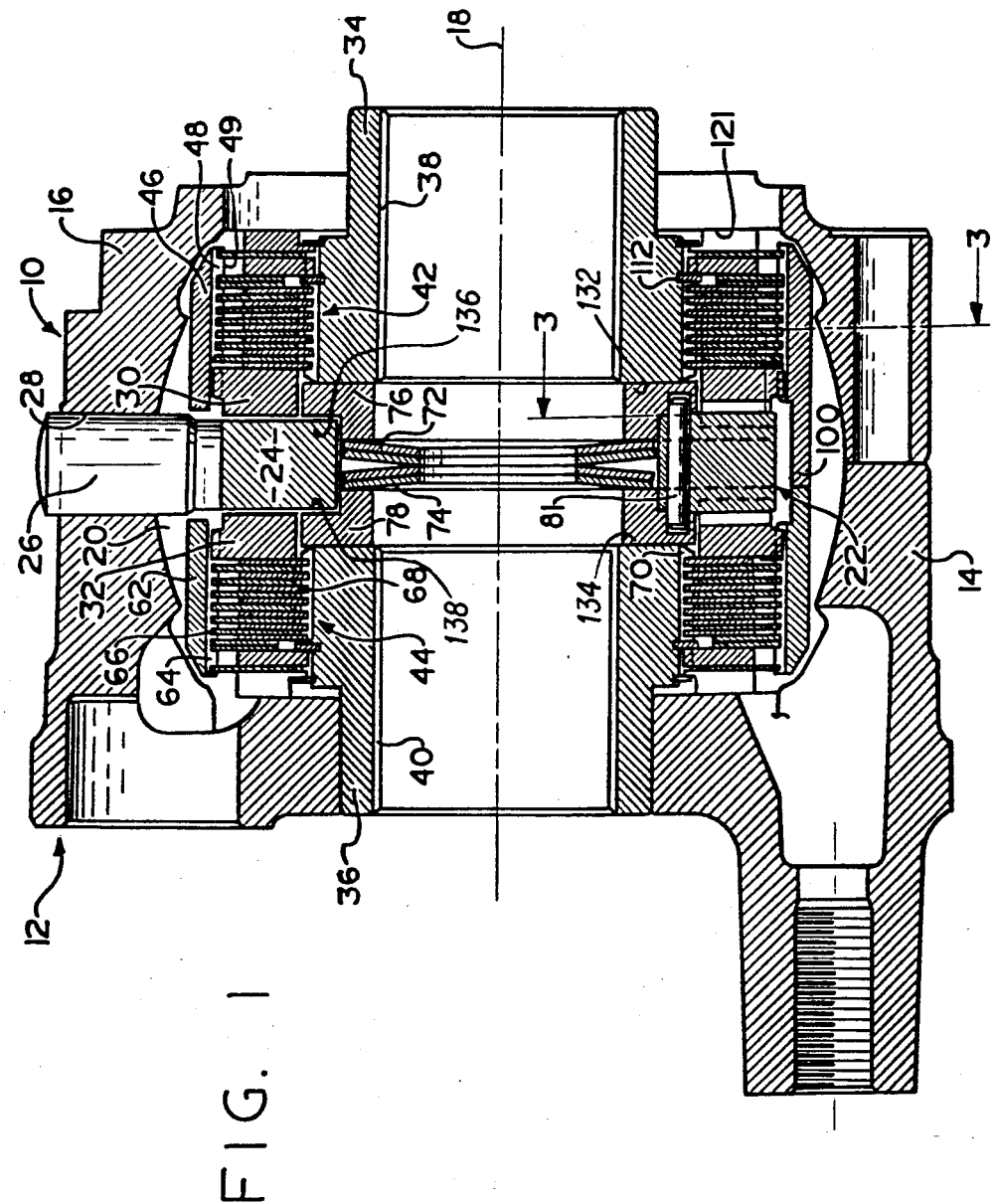
FIG. 1 is a plan view, in section, of the positive drive of the present invention taken substantially along line 1—1 in FIG. 3.

In the following description of the preferred embodiment certain terms will be used for convenience in reference only and are not intended to be limiting. The terms "upward", "downward", "rightward" and "leftward" refer to directions in the drawings to which reference is made. The terms "inward", and "outward", respectively, refer to directions towards and away from, respectively, the geometric center of the device being described. The above applies to the words above specifically mentioned, derivatives thereof and words of similar inport.

Figure 2:
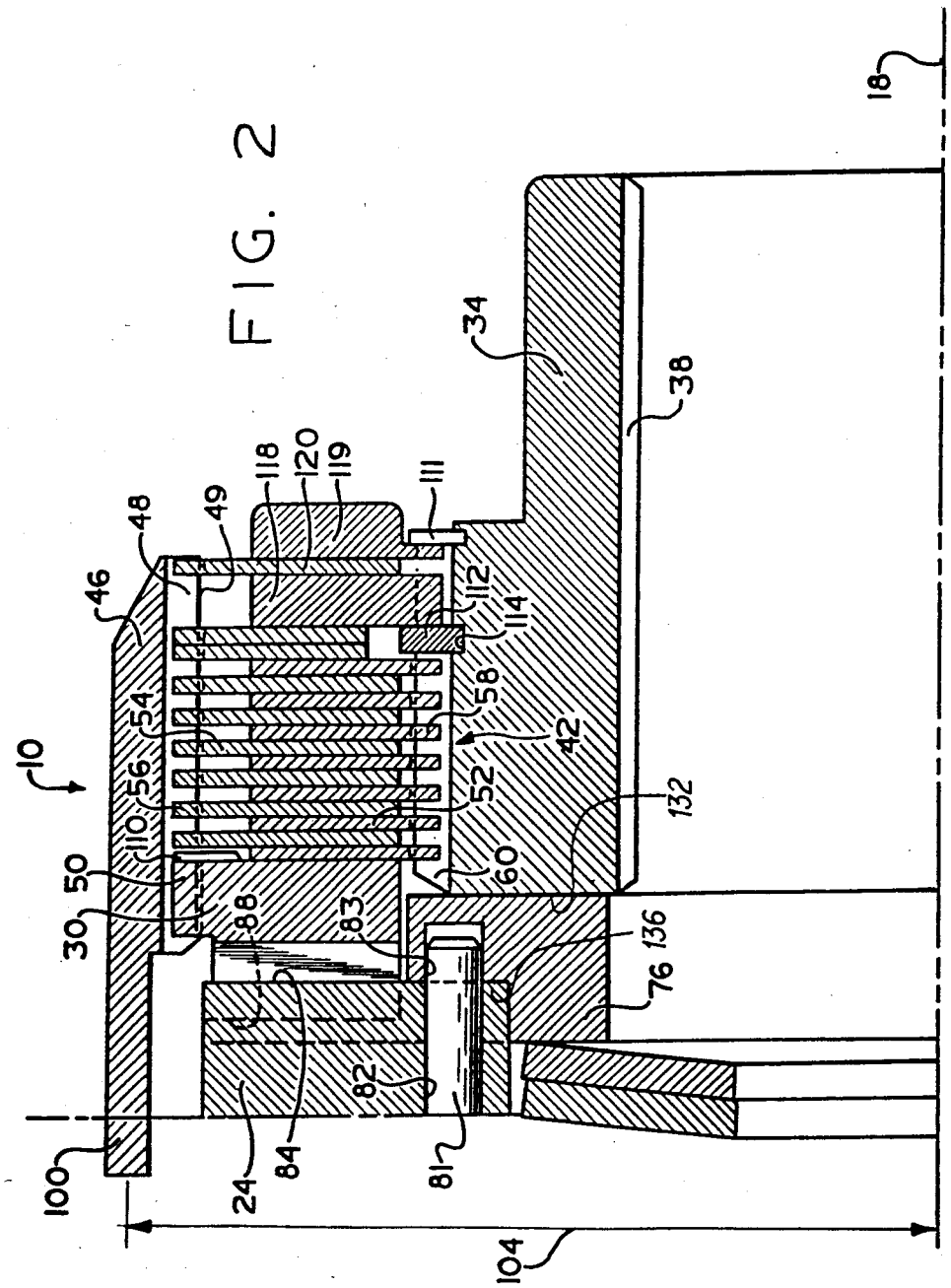
FIG. 2 is a partial, enlarged quarter view, in section, of the positive drive illustrated in FIG. 1.
Figure 3:
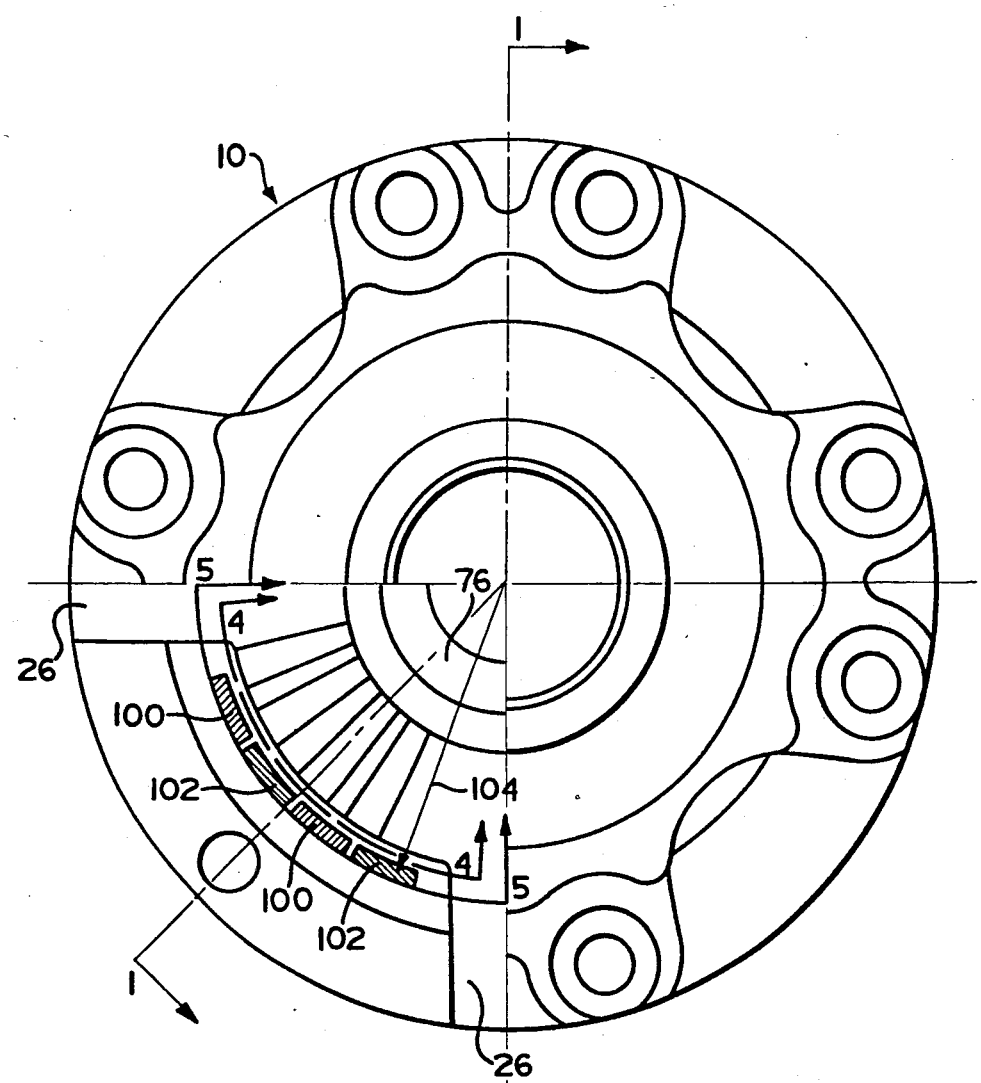
FIG. 3 is an end view, with a quarter view in section, taken substantially along line 3—3 in FIG. 1.
Figure 4:
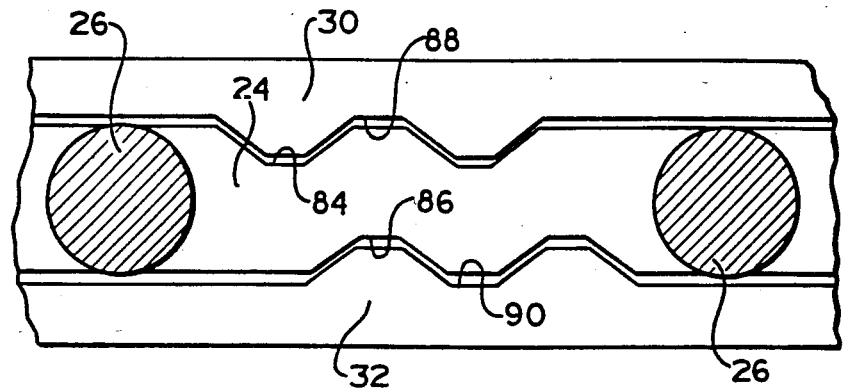
FIG. 4 is a radial view taken substantially along line 4—4 in FIG. 3.
Figure 5:
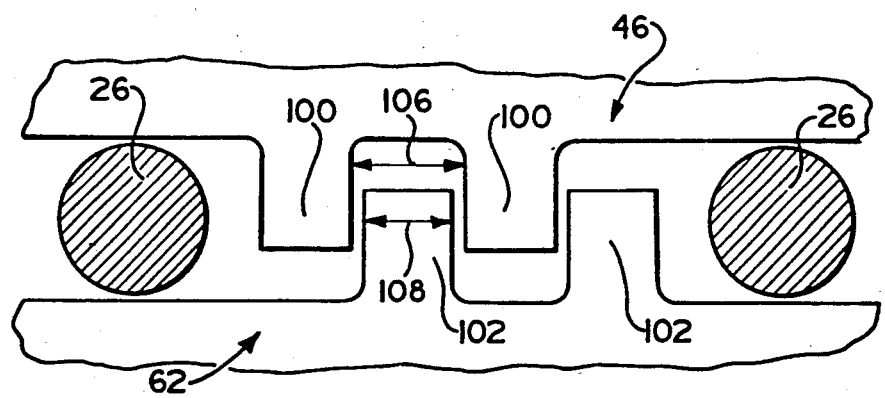
FIG. 5 is a radial view taken substantially along line 5—5 in FIG. 3.

The positive drive mechanism 10 of the present invention may be seen by reference to FIGS. 1-8 and includes a housing 12 which may comprise a lefthand portion 14 and a righthand portion 16 attached by bolts or other means (not shown). Preferably, housing 12 has an exterior and an interior configuration substantially similar, or identical, to the exterior configuration of standard differential housings such as are utilized in connection with single or multiple speed drive axles. Single and multiple speed drive axles, and the differential housings utilized therewith, are well known in the prior art and may be appreciated in greater detail by reference to U.S. Pat. Nos. 2,932,218; 3,146,842; 3,195,371 and 3,502,177, the disclosures of which are all hereby incorporated by reference. Briefly, as is well known in the prior art, housing 12 is typically drivingly connected to a ring gear (not shown) which in turn is drivingly associated with a drive pinion gear (not shown) driven by the output or drive shaft (not shown) of a vehicle transmission (not shown). Accordingly, housing 12 is rotatable about axis 18 as a result of driving torque transmitted from the vehicle engine (not shown), through the transmission and drive shaft, and through the unshown drive pinion and ring gears. As stated above, the positive drive of the present invention may also be utilized with a power divider or transfer case.

Housing 12 defines an internal cavity 20 in which a centrally located drive cam 22 is located for joint rotation with housing 12. Drive cam 22, which is shown in FIG. 7, comprises an annular ring-like portion 24 and a plurality of radially outwardly extending arm members 26 which are generally equally circumferentially spaced about the ring portion 24 and are received within bores or notches 28 provided in the housing 12 to rotationally fix the drive cam to the housing. It may thus be seen that the mounting of drive cam 22 to the housing 12 is similar to the mounting of a conventional differential spider to the differential housing of a drive axle utilizing a conventional open bevel gear differential. It is understood, that other configurations of drive cam or drive cam mounting, such as splines or lugs, are possible within the scope of the present invention as may be seen by reference to published British Patent Application No. GB 2,119,040A.

Disposed on opposite sides of the drive cam 22 are a pair of clutch cams 30 and 32. Supported within the housing 12 for rotation about axis 18 relative to the housing are a pair of output coupling members 34 and 36. The output coupling members 34 and 36 define internal splines 38 and 40, respectively, which are adapted for engagement with sets of external splines defined by right and lefthand axle shafts (not shown) in a manner similiar, preferably identical, to that by which the side gears of a convention differential are drivingly attached to axle shafts.

Disposed between clutch cam 30 and output coupling member 34 is a clutch assembly 42 and disposed between the clutch cam 32 and output coupling member 36 is a clutch assembly 44. Clutch assemblies 42 and 44 are defined in part by interdigitated clutch discs which comprise the primary clutches of the clutch assemblies.

A generally tubular clutch sleeve 46 is provided with straight internal splines 48 in the interior bore 49 thereof which mesh with external splines 50 provided on the outer periphery of annular clutch cam 30. The friction clutch assembly 42 includes a plurality of alternatively interleaved or interdigitated generally flat clutch discs 52 and 54. Clutch discs 54 are provided with external splines 56 for splined engagement with internal splines 48 of the clutch sleeve 46 while clutch discs 52 are provided with internal splines 58 for splined engagement with external splines 60 provided on the outer periphery of output coupling member 34. In a similar manner, lefthand clutch sleeve 62 is provided with internal splines 64 for splined engagement with clutch cam 32 and clutch discs 66 while clutch discs 68 which are interleaved with clutch discs 66, are in splined engagement with exterior spline 70 provided on the lefthand output coupling 36. Preferably, clutch sleeves 46 and 62 are identical.

Resilient means, such as singular or stacked Belville washers 72 and 74, respectively, may be utilized to provide an outward axial bias to thrust washers 76 and 78, respectively, for purposes of providing an axially outwardly biasing force to the clutch cams 30 and 32, or discs of the clutches 42 and 44, and/or between the drive cam 22 and the output couplings 34 and 36, to preload same. For this purpose, thrust washers 76 and 78 are fixed for rotation with, but axial movement relative to, the drive cam 22 by means of pins 81 received in axially extending bores 82 and 83, respectively, provided in the drive cam and thrust washers, respectively. Retaining rings 110 and 111 may be utilized to secure the friction clutches 42 and 44 in the sleeves 46 and 62. Rings 112, received in a grooves 114 provided in the outer diameter surface of the couplings 34 and 36, may be utilized to react axial forces on the thrust washers and the couplings to axially outer friction leaves or discs 118, 119 and 120 and surface 121 on the housing for preload and/or dampening purposes.

The radially inward ring portion 24 of drive cam 22 defines a pair of axially opposite cam surfaces 84 and 86, respectively, for cooperation with ramped cam follower surfaces 88 and 90, respectively, provided on clutch cams 30 and 32, respectively. Preferably, the cam and ramp surfaces are of the "rise and fall" type now well known in the art and illustrated in greater detail in U.S. Pat. No. 3,831,462 the disclosure of which is hereby incorporated by reference. With so called cooperating rise and fall cam and ramp surfaces, rotation of the drive cam 22 relative to the clutch cams 30 and 32 results in engagement of the cam surfaces 84 and 86 with the ramp surfaces 88 and 90, respectively, and further relative rotation results in axial movement of clutch cam 30 to the right or clutch cam 32 to the left, respectively, which results in increasing frictional engagement of frictional clutches 42 and 44, respectively. When surfaces 84 and 88 and/or surfaces 86 and 90 are not engaged, friction clutches 42 and 44 are in the disengaged mode. It is understood that in the disengaged mode, clutches 42 and/or 44 may be partially engaged with a limited torque transfer capacity for preload and/or damping purposes.

In the engaged mode of clutches 42 and 44, respectively, drive torque is transmitted to output couplings 34 and 36, respectively, and the axle shafts drivingly connected thereto.

Although clutch cams 30 and 32 are shown as axially moveable relative to sleeves 46 and 62, respectively, it is understood that the clutch cams and sleeves can be axially fixed for joint axial movement relative to the clutch friction discs.

As is well known for positive drive traction modifiers of the type described, an important operational feature is that torque be applied substantially equally to the output couplings when the output couplings are rotating at approximatly equal speeds and that torque be applied to the slower rotating output coupling when the output couplings are rotating at substantially different speeds, such as would occur when a vehicle is in a turn or going around a corner. To assure that the output coupling associated with the faster rotating axle shaft is allowed to free wheel, the friction clutch associated therewith must be allowed to remain in the disengaged mode and the clutch cam associated therewith must be restrained from engagement with the trailing cam surface of the drive cam 22. To accomplish this, it is necessary that the two clutch cams, 30 and 32, be directly or indirectly rotationally connected with only a predetermined degree of rotational or angular freedom therebetween. By way of example, the angular freedom therebetween must be sufficient to allow the leading surfaces of cam surface 84 to engage ramp surface 88 while the leading surface of cam surface 86 is disengaged with ram surface 90 but insufficient to allow the leading surface of cam surface 84 to engage ramp surface 88 while the trailing surface of cam surface 86 simultaneously engages ramp surface 90. This requirement for rotational interconnection between the clutch cams with a predetermined degree of rotational freedom therebetween, i.e. balking means, is well known in the prior art and may be seen by reference to above mentioned U.S. Pat. Nos. 4,400,996 and 2,179,923. As it is desireable that an accurately known, preferably relatively small, relative rotation between the drive cam and clutch cam be required for engagement of a clutch, the rotational accuracy of the balking means must be relatively great.

In the present embodiment, to achieve rotational connection between the clutch cams 30 and 32, with a predetermined limited degree of rotational freedom therebetween, each of the clutch sleeves, 46 and 62, respectively, is provided with axially inwardly extending balking teeth or fingers 100 and 102, respectively, extending from the outer periphery therof and formed integrally therewith. As may be seen by reference to FIG. 5, the teeth 100 and 102 extend axially toward one another in the circumferential space between the arm portions 26 of the drive cam 22. As may be seen, lateral teeth 100 and 102 cooperate in an interengaged relationship to define a claw-coupling which has a certain degree of rotational freedom therebetween, which degree of rotational freedom is defined by the circumferential space or backlash between teeth 100 and 102 and the radial distance 104 between the interengaging teeth and the axis of rotation 18.

Accordingly, if the circumferential backlash B (toothspace 106 minus tooth thickness 108 at the pitch radius 104) between balking teeth 100 and 102 is known, and the pitch radius, R, of the balking teeth from the axis of rotation 18 is known, the rotational freedom RF, expressed in radians, between the clutch cams 30 and 32 may be expressed as: $RF = B/R$ It may also be seen, that by locating the balking teeth 100 and 102 at the greatest possible radius from axis of rotation 18, errors in the backlash B between the interegaging balking teeth 100 and 102 due to manufacturing tolerances and the like will have a minimized effect on the relative rotational free play between the clutch cam members 30 and 32. In the present invention, the interacting balking teeth 100 and 102 are formed integrally with clutch sleeves 46 and 62, respectively, and are located radially outwardly of the clutch cams and friction clutch assemblies thereby allowing a balking mechanism of high rotational accuracy for a given degree of manufacturing tolerance.

The clutch sleeves 46 and 62 are relatively simple tubular structures which are provided with internal splines and integral interengaging balking fingers or teeth thereon which balking fingers are formed at an outer diameter location where machining is relatively easier and wherein angular accuracy for a given degree of machining precision is greater. Additionally, as the clutch cams are separate pieces which are easily assembled to the clutch sleeves by means of a spline connection, the clutch cams and the relatively complex cam follower ramp surfaces carried thereby may be produced with relatively simple holding fixtures and the like without interference from any component attached thereto.

It has been found that the clutch sleeves of the present invention may be produced by relatively conventional, relatively less expensive manufacturing methods, such as milling, turning and/or broaching, as opposed to the relatively more expensive methods of powder metal casting, forging or the like usually associated with the clutch cams.

As mentioned briefly above, even in the disengaged modes of clutches 42 and 44, it is desireable to maintain at least a partial engagement of clutches 42 and 44 for preload purposes as is well known in the art. Additionally, as will be discussed in greater detail below, at least a limited frictional engagement between the drive cam-housing 12 and the output couplings 34 and 36 even in the disengaged modes of clutches 42 or 44 is also desireable to dampen and/or minimize any tendency of the positive drive 10 to shutter. In the embodiment shown, a constant axial force to preload clutches 42 and 44 and to maintain a frictional connection between the drive cam and output couplings is provided by the resilient means, Belville washers 72 and 74, which bias the thrust washer 76 and 78 axially outwardly into contact with the axially inner surfaces 132 and 134, respectively, of the coupling members 34 and 36. In addition to the direct frictional connection at faces 132 and 134, a frictional connection is provided at friction discs 118, 119 and 120 which are biased into axial contact by the action of ring 112 which is axially fixed to the coupling members 34 and 36 at grooves 114 and at the direct contact of disc 119 with housing surface 121.

Accordingly, Belville washers 72 and 74 provide a constant partial engagement of certain of the discs of the clutches 42 and 44 and a constant frictional engagement (at faces 132 and 134) between the drive cam and output coupling regardless of the engaged or disengaged mode of operation of clutches 42 and 44 resulting from action of the clutch cam members 30 and 32.

Friction discs of clutches 42 and 44, respectively, in combination with the friction surfaces 132 and 134, and friction discs 119 with housing surface 121 respectively, may be considered first and second friction clutch means, respectively, between the driving drive cam 22 and the output couplings 34 and 36, respectively. Friction disc portions of clutches 42 and 44 may be considered the primary clutches, engaged and disengaged by the clutch cams, while clutch discs 118, 119 and 120, the surfaces 132 and 134, and disc 119 and housing surface 121 may be considered the secondary clutches for providing a preload and a shutter dampening frictional connection.

By creating a constant partial preload engagement of the friction clutches 42 and 44 (i.e., at discs 118, 119 and 120, and at disc 119 and surface 121) and a constant frictional connection (at faces 132 and 134) between the drive cam (and/or housing) and the output coupling, a constant drag on the faster rotating wheel of a vehicle while cornering or rounding a turn is provided. Such a rotational drag does, of course, have a negative or undesireable effect as the driven wheel must overcome same. For example, if the outside wheel of a cornering vehicle has a drag equaling 500 lbs.-feet, a torque of 600 lbs.-feet to the inside wheel would result in only 100 lbs.-feet of resulting torque to power the vehicle. Excessive drag can also cause excessive wear of the drive line components and the tires. Accordingly, it is desireable to limit, to the extent possible, the rotational drag on a nondriven wheel resulting from the partial engagement of the clutches and the constant frictional connection between the drive cam (and/or housing) and the coupling member associated with the nondriven wheel.

If positive drive devices operated in an ideal manner, the ideal total drag imposed on a nondriven or substantially nondriven wheel (i.e. the output coupling associated with that wheel) would be that drag resulting from the partial engagement necessary to properly preload the clutches 42 and 44. However, it has been discovered that in certain operating conditions, usually associated with a break in drive line torque (i.e. master clutch disengaged) or a rapid deceleration of the vehicle, during a vehicle turning or cornering operation, a positive drive may tend to cause rapid cycling of the clutches, 42 and 44, associated with the inside and outside wheels between an engaged and disengaged operating condition. This condition is usually referred to as "shutter" and is often highly undesireable. Although there is some disagreement as to the causes of shutter, it is generally believed to be related to the rapid winding up and unwinding of the relatively torsionally elastic drive shaft and axle shafts, often at different rates and in different directions of rotation, as engine drive torque is removed from the drive shaft or the direction of torque on the drive shaft is reversed.

It has been found that by providing a frictional grounding connection between the output couplings (fixed to the axle shafts) and the drive cam (drivingly fixed to the drive shaft), that the shutter conditions can be minimized and/or dampened. Briefly, the forces required to slip the friction surfaces engaged between the drive shaft and drive axles will dissipate much of the energy resulting from the conditions causing the shutter and/or from the conditions created by the shutter. It has also been found that the magnitude of torque transfer capacity of the frictional surfaces engaged between the drive cam and the output coupling associated with the nondriven wheel required to acceptably minimize or dampen a shutter condition is related to or proportional to the peak torque level of the torque transmitted by the fully engaged clutch, 42 or 44, during or just prior to the onset of the shutter causing conditions.

Accordingly, to dampen shutter and/or shutter causing conditions occuring during or just subsequent to conditions wherein the fully driven output coupling is driven with a relatively high torque, a relatively large torque transfer capacity on the frictional coupling between the drive cam and the substantially nondriven output coupling is required. However, if such a large axial dampening force is provided on a constant basis, a relatively large undesireably high drag force will be imposed upon the nondriven wheel at all times.

The present invention minimizes the above problem, while supplying an axial dampening force and resulting dampening frictional coupling between the drive cam and the nondriven or substantially nondriven output coupling by providing a total or cumulative axial dampening force comprising two components, namely a fixed component as described above and supplied by the resilient means 72 and 74, and a variable component which is proportional to the difference in torque supplied to the slower rotating output coupling and the faster (usually nondriven) output coupling.

The variable component of axial dampening force to frictionally engage the drive cam and output coupling associated with the faster rotating, or nondriven, wheel is reacted through the thrust washers 76 and 78 directly to the coupling surfaces 132 and 134, as is the case of the fixed component of the axial dampening force. The thrust washers 76 and 78 are provided with generally radially extending surfaces 136 and 138 which are axially engageable with portions of surfaces 84 and 86 of the drive cam 22. As has been discussed above, the drive cam 22 is rotationally mounted to the housing 12 by means of arms 26 only, which arms extend radially outwardly from the annular ring portion 24 thereof. The axial thickness of ring portion 24 of the drive cam 22, the axial thickness of thrust washers 76 and 78, and the axial separation of surfaces 132 and 134 of coupling members 34 and 36, respectively, from the ring members 112 received therein is selected so that unbalanced axial forces applied to the ring portion 24 of the drive cam 22 as the result of full engagement of only one of the clutch means 42 or 44, or engagement at different torque levels, is reacted, at least in part, to the thrust washer associated with the output coupling coupled to the substantially nondriven wheel. Of course, by properly designing the deflection of the cam member 22 and the axial clearance between arms 26 and bores 28 of the housing 12, a smaller or greater proportion of the unbalanced force may be directed to the thrust washers. Accordingly, a variable axial dampening force, proportional to the magnitude of the difference in torque supplied to the fully driven wheel and substantially nondriven wheel, will be applied to the secondary clutch surfaces frictionally coupling the drive cam 22 and/or housing 12 to the output coupling associated with the nondriven wheel.

This is highly desireable as the drag created on the nondriven or free wheeling wheel will always be only a fraction of the torque available to the driven wheel and the drag on the free wheeling wheel need not constantly be at the high value associated with sufficient frictional dampening to dampen shutter conditions during high torque transfer conditions.

While the variable component of the axial dampening force will drop off or decrease rapidly as the drive line torque is decreased, the initial high value of the axial dampening force and the resulting high frictional dampening connection between the drive cam and the output coupling associated with the nondriven wheel will be available at the initiation of a shutter condition to quickly dampen same. Also, should shutter continue, the value of frictional torque available to dampen same will be proportional to the energy of the shutter oscillations.

The present invention has been described in detail sufficient to enable one skilled in the art to practice same. Upon a reading and understanding of the Specification, certain modifications and alternations of the invention will become apparent to those skilled in the art, and it is intended that the invention include all such modifications and alterations, insofar as they come within the scope of the following claims.

I claim:

1. An improved positive drive of the type including a housing, a drive cam rotationally fixed to the housing first and second output coupling members adapt to drive first and second shafts, first and second clutch means associated with said first and second output coupling members, each of said clutch means having a disengaged mode which allows its respective output coupling member to rotate relative to said drive cam member and an engaged mode which maintains a predetermined rotational relationship between said respective output coupling member and said drive cam member, first and second clutch cams having cam follower ramp surfaces for interaction with cam surfaces provided on said drive cam, said first and second clutch cams effective to engage and disengage said first and second clutch means, respectively, and balking means associated with said first and second clutch cams to limit the relative rotational displacement therebetween, said positive drive characterized by;

means responsive to greater torque transmittal through one of said clutch means relative to the torque transmittal through the other of said clutch means to frictionally ground said output coupling associated with said other clutch means to said housing.

2. The improved positive drive of claim 1 wherein said means to ground said coupling associated with said other clutch means will ground said coupling associated with said other clutch means to said housing with a torque magnitude proportional to the difference in magnitude of torque transferred from said housing to said output coupling associated with said one of said clutch means and to said output coupling associated with said other clutch means.

3. The improved positive drive of claim 2 wherein said means to ground comprises a first and second thrust washer axially interposed said drive cam and said first and second output couplings, respectively, axial deflection of said drive cam relative to said housing effective to cause one of said first and second thrust washers to frictionally engage one of said first and second output couplings.

4. The improved positive drive of claim 3 wherein said thrust washers are fixed for rotation with said drive cam.

5. The improved positive drive of claim 4 wherein said thrust washers each define a surface directly frictionally engageable with a surface on said output couplings.

6. The improved positive drive of claim 4 additionally comprising resilient means effective to constantly bias said thrust washers into frictional engagement with the output couplings associated therewith.

7. The improved positive drive of claim 6 wherein said first and second clutch means comprise friction clutches.

8. The improved positive drive of claim 7 wherein said first and second clutches are multidisc friction clutches, outward axial movement of said thrust washers effective to engage a less than total number of the discs of said clutches.

9. An improved positive drive of the type including a housing, a drive cam rotationally fixed to the housing, first and second output coupling members adapted to drive first and second shafts, first and second clutch means associated with said first and second output coupling members, each of said clutch means having a disengaged mode which allows its respective output coupling member to rotate relative to said drive cam member and an engaged mode which maintains a predetermined rotational relationship between said respective output coupling member and said drive cam member, first and second clutch actuation means for applying said first and second clutch means, respectively, said actuation means comprising primary actuation means and secondary actuation means for applying said clutches independently of the primary actuation means associated therewith, said primary actuation means comprising first and second clutch cams having cam follower ramp surfaces for interaction with cam surfaces provided on said drive cam, said first and second clutch cams effective to engage and disengage said first and second clutch means, respectively, and balking means associated with said first and second clutch cams to limit the relative rotational displacement therebetween, said positive drive characterized by;

each of said secondary clutch actuation means applying said clutch means with a total torque transmitting capacity comprising a first fixed component and a second variable component present in only the substantially disengaged condition of the clutch means associated therewith and having a magnitude increasing with the magnitude of torque transmitted by the clutch means associated with the other of the clutch actuation means.

10. The improved positive drive of claim 9 wherein said first fixed component of torque transfer capacity supplied by said secondary clutch actuation means is supplied by resilient means.

11. The improved positive drive of claim 10 wherein the second variable component of torque transfer capacity supplied by said secondary clutch actuation means results from reaction forces from the engaged clutch means.

12. The improved positive drive of claim 11 wherein said drive cam is rotationally fixed to said housing by means of a plurality of radially outwardly generally equally circumferentially spaced arms, and further including a first and second thrust washer axially interposed said drive cam and said first and second output couplings, respectively, axial deflection of said drive cam relative to said housing effective to cause one of said first and second thrust washers to frictionally engage one of said first and second output couplings.

13. The improved positive drive of claim 12 wherein said thrust washers are fixed for rotation with said drive cam.

14. The improved positive drive of claim 13 wherein said thrust washers each define a surface directly frictionally engageable with a surface on said output couplings.

15. The improved positive drive of claim 13 wherein said resilient means are effective to constantly bias said thrust washers into frictional engagement with the output couplings associated therewith.

16. The improved positive drive of claim 15 wherein said resilient means comprise Belleville washers.

17. The improved positive drive of claim 11 wherein said first and second clutches are friction clutches.

18. An improved positive drive of the type including a housing, a drive cam rotationally fixed to the housing, first and second output coupling members adapted to drive first and second shafts, first and second friction clutch means associated with said first and second output coupling members, each of said clutch means having a disengaged mode which allows its respective output coupling member to rotate relative to said drive cam member and an engaged mode which maintains a predetermined rotational relationship between said respective output coupling member and said drive cam member, each of said first and second clutch means including a primary clutch operable, in the engaged mode, to transmit torque from the respective cam means to the respective output member, and a secondary clutch operable, in either the engaged mode or the disengaged mode of the primary clutch, to transmit torque directly from the input member to the respective output member; said positive drive characterized by:

each of said secondary clutches having a total torque transmitting capacity magnitude comprising a first fixed magnitude component and a second variable magnitude component present only when the primary clutch associated therewith transmits less torque than the other of said primary clutches and having a magnitude increasing with the difference in magnitude of torque transmitted by the primary clutches.

19. The improved positive drive of claim 18 additionally comprising first and second clutch cams having cam follower ramp surfaces for interaction with cam surfaces provided on said drive cam, said first and second clutch cams effective to engage and disengage the primary clutches of said first and second clutch means, respectively, and balking means associated with said first and second clutch cams to limit the relative rotational displacement therebetween.

20. The improved positive drive of claim 19 wherein engagement of one of said clutch means and substantial disengagement of the other said clutch means will cause an axially unbalanced force on said drive cam, said second variable magnitude component proportional to the magnitude of said axially unbalance force on said drive cam.

21. The improved positive drive of claim 20 wherein said secondary clutches each comprise a thrust washer interposed said drive cam and one of said output couplings, said thrust washers frictionally engageable with said one of said output couplings.

22. The improved positive drive of claim 21 wherein said thrust washers are fixed for rotation with said drive cam and axially movable in said housing relative to said drive cam and said clutch cams.

23. The improved positive drive of claim 22 additionally comprising resilient means constantly urging said thrust washers into frictional engagement with said output couplings.

24. A positive drive comprising a housing, a drive cam rotationally fixed to the housing by means of a plurality of radially outwardly extending generally equally circumferentially spaced arms, first and second output coupling members adapted to drive first and second shafts, first and second friction clutch means associated with said first and second output coupling members, each of said clutch means having a disengaged mode which allows its respective output coupling member to rotate relative to said drive cam member and an engaged mode which maintains a predetermined rotational relationship between said respective output coupling member and said drive cam member, first and second clutch cams having cam follower ramp surfaces for interaction with cam surfaces provided on said drive cam, said first and second clutch cams effective to engage and disengage said first and second clutch means, respectively, balking means associated with said first and second clutch cams to limit the relative rotational displacement therebetween, and first and second thrust washer means axially interposed said drive cam and said first and second output couplings, respectively, said thrust washers rotationally fixed to said drive cam, axially movable in said housing relative to said drive cam and output couplings and frictionally engageable with the output coupling associated therewith, whereby axial deflections of said drive cam towards one of said output couplings will cause said output coupling to be frictionally coupled to the thrust washer interposed therebetween with a torque transfer capacity increasing with the degree of deflection of said drive cam.

25. The positive drive of claim 24 additionally comprising resilient means constantly urging said first and second thrust washer into contact with said first and second output coupling, respectively.

* * * * *